Sept. 25, 1962 E. SEIBOLD ET AL 3,055,169
POWER PLANT WITH DRIVE MOTOR AND HYDRODYNAMIC
TRANSMISSION AND CONTROLS FOR OPERATING SAME
Filed June 22, 1959 5 Sheets-Sheet 5
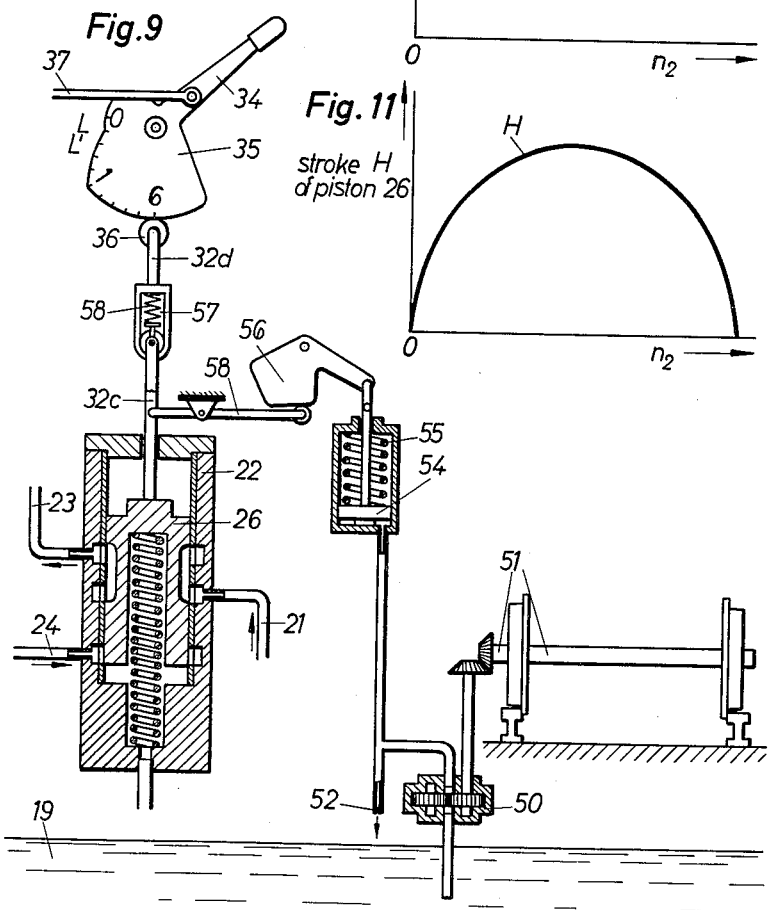
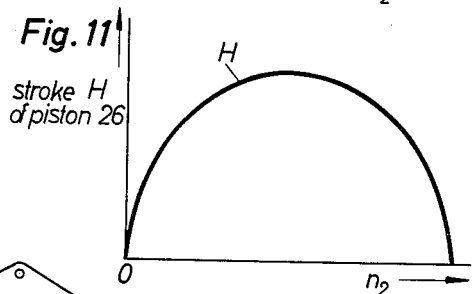
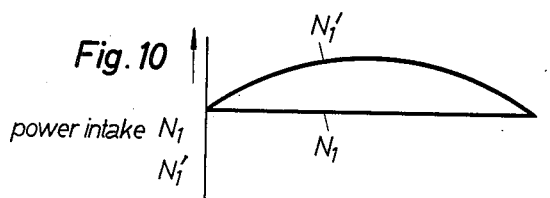
INVENTORS:
Ernst Seibold
Helmut Müller
BY United States Patent Office 3,055,169
Patented Sept. 25, 1962

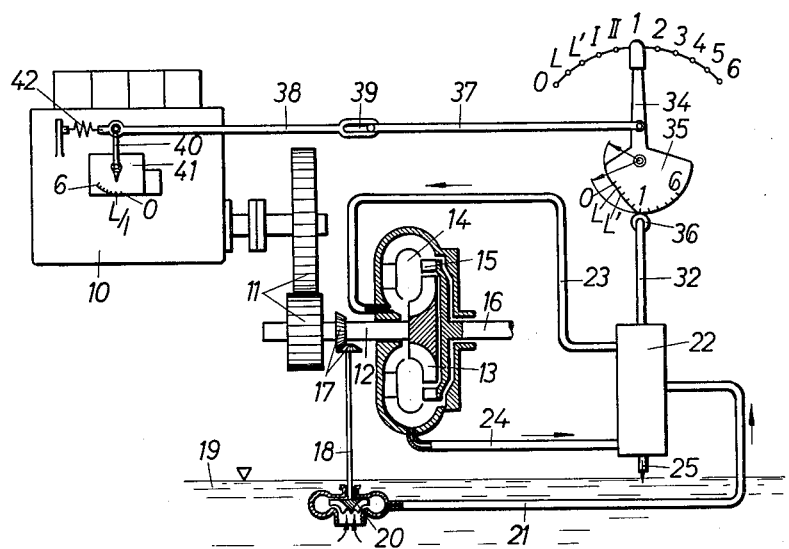

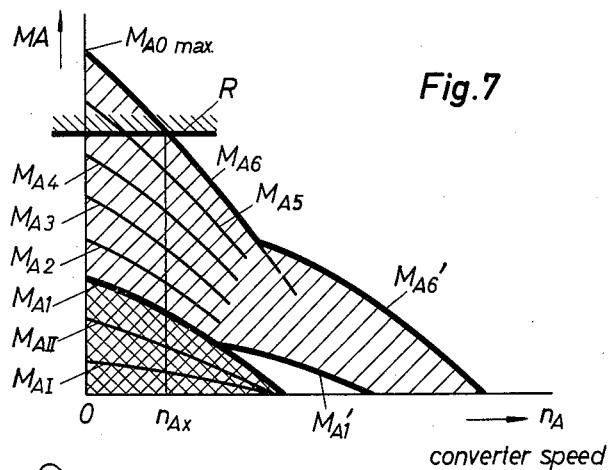
Fig.7
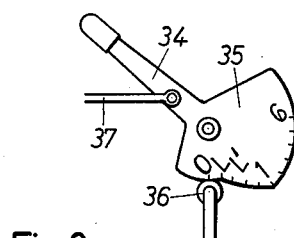
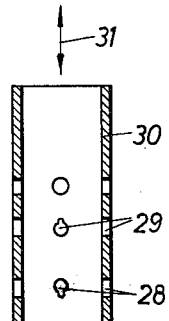
Fig.2
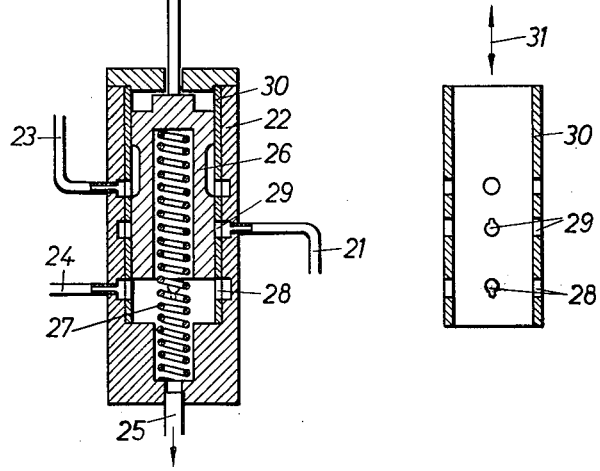
Fig.3
INVENTORS:
Ernst Seibold
Helmut Müller
BY

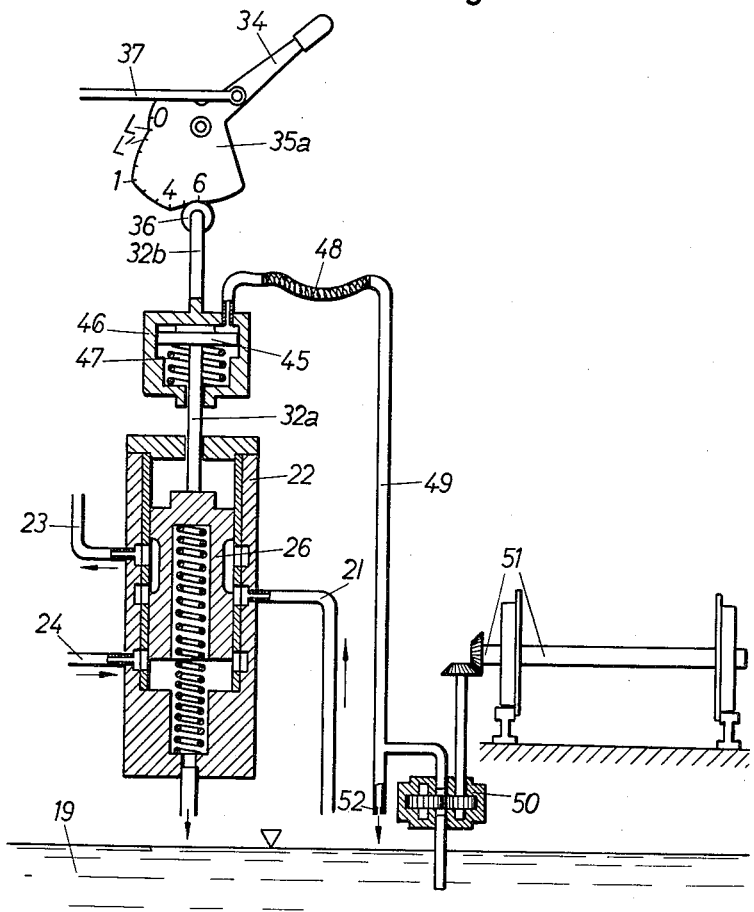

3,055,169
POWER PLANT WITH DRIVE MOTOR AND HYDRODYNAMIC TRANSMISSION AND CONTROLS FOR OPERATING SAME
Ernst Seibold and Helmut Müller, Heidenheim, Germany, assignors to J. M. Voith G.m.b.H., Heidenheim, Germany
Filed June 22, 1959, Ser. No. 822,166
Claims priority, application Germany June 27, 1958
8 Claims. (Cl. 60—12)

This invention relates to power transmissions and to a method of operating power transmissions, particularly in connection with rail vehicles.

Driving systems for rail vehicles often employ a variable speed drive motor, such as an internal combustion engine, and many times comprise a hydraulic transmission between the engine and the wheels which includes one or more hydraulic torque converters. The power control in such a case is usually effected by varying the speed of the driving engine. In such instance, the torque converter or converters receive a power input which is proportional to the third power of the motor speed in conformity with the equation $N = C \times n^3$, N representing the power received from the torque converter, while $n$ indicates the input speed of the torque converter, and C represents a constant depending on the design or the construction of the torque converter. Thus, aside from a device for completely filling and emptying the torque converter or converters, the torque converter or converters do not require any complicated control elements such as tiltable blades, slide rings or the like. In this way, for the purpose involved, simple and economic torque constructions can be employed which are safe and reliable in operation. Nevertheless, with certain driving systems, additional difficulties have been encountered due to the fact that for instance an internal combustion engine can be controlled downwardly only up to its idling speed which sometimes is relatively high. At the said idling speed, the torque converter still requires such a power that an operation with very low pulling forces at simultaneously low driving speeds, as for instance for switching operations, cannot be obtained without certain difficulties. This deficiency is particularly noticeable with drives comprising a diesel engine, because the idling speed of a diesel engine is about 40% of its maximum speed, which corresponds to a minimum power taken in by a converter of 6.4% of the full engine power output. This lower power limit is still too high for a proper switching operation, particularly with drives of a high output.

Similar difficulties are also encountered when employing different drive motors which are controllable within certain limits, for instance with drives comprising electric motors controllable within certain limits. Thus, there are known for instance direct current motors which can be controlled downwardly only up to approximately 40% of their maximum speed.

With drives of this type, heretofore the drive was alternately switched on and switched off in order to obtain low driving speeds, or brakes were employed in order to destroy excessive power. Such steps are, however, not a satisfactory solution.

Furthermore, in order to overcome the above mentioned drawbacks, it has been suggested to provide the guide wheel or pumping wheel of the starting torque converter with tiltable blades or to arrange a ring slide movable into the working chamber of the converter. Such an arrangement makes it possible to reduce the power down to nearly zero. Such arrangements, however, require additional equipment and furthermore, particularly when employing tiltable pumping blades, are not as reliable in operation as torque converters with fixed blades. This is due primarily to the fact that torque converters for purposes of obtaining small dimensions always work at high speeds and therefore have a relatively high specific blade load.

It is an object of the present invention to provide a drive system of the above mentioned general type, which will overcome the above mentioned drawbacks but will still allow control of the output power down to approximately zero.

It is a further object of this invention to provide a driving system according to the preceding paragraph, which will realize the advantages mentioned therein while employing a torque converter with fixed blades and a well-known and proved filling control.

These and other objects and advantages of the invention will appear more clearly from the following specification in connection with the accompanying drawings, in which:

FIG. 1 diagrammatically illustrates a locomotive driving system with a controllable diesel engine and a torque converter and with a control device according to the present invention.

FIG. 2 shows on a somewhat larger scale than that of FIG. 1 the control slide of FIG. 1 for the torque converter.

FIG. 3 represents a detail of the control slide with control apertures.

FIG. 7 is a further diagram illustrating the relationship between the output speed and the output torque of the torque converter.

FIGS. 8 and 9 show a portion of two control mechanisms modified over that of FIG. 1.

FIGS. 10 and 11 represent two diagrams illustrating for the device of FIG. 9 the course of the torque power input and the control piston stroke in conformity with the torque output speed.

*General Arrangement*

Figure 4:
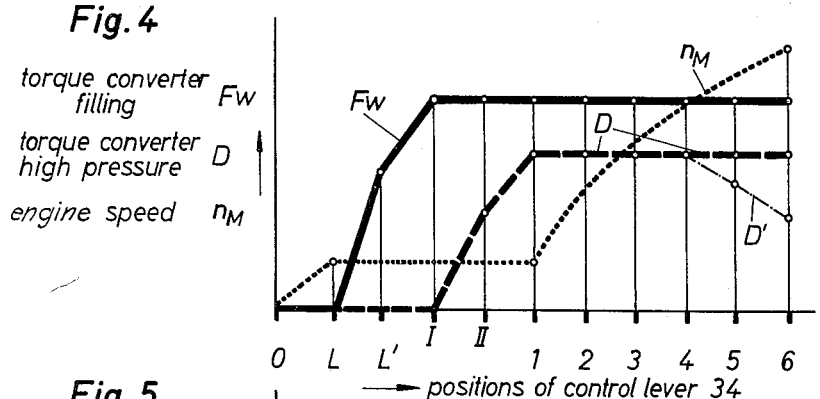
FIGS. 4 to 6 illustrate three diagrams explaining the connection between the drive lever position on one hand and the engine and torque converter operational factors on the other hand.

The above outlined drawbacks have been overcome according to the present invention which starts from a drive with a drive engine adapted to be varied as to speed within certain limits and also provided with a hydrodynamic transmission which latter in its lower velocity range works as a torque converter. Such driving system is operated according to the present invention in conformity with a new method which is characterized in that the engine for controlling low outputs down to zero is held at a substantially constant low speed, preferably at its idling speed while the high pressure and/or the degree of filling in the torque converter are reduced with regard to their full values, and that furthermore for controlling all higher outputs the engine speed only or primarily only will be changed.

Experience has shown that by controlling the high pressure and particularly the filling in the torque converter, the air contents in the working fluid and thus also the density thereof, which is important for the transfer capability, is changed and that this represents a particularly advantageous step which makes it possible within the working range with low outputs to control the input and output of the torque converter and to reduce the same practically down to zero. Within this range of operation, the output control may be effected as continuously as with torque converters equipped with adjustable blades so that the method according to the present invention makes possible a fine shunting or switching with low traction forces and at low driving speeds.

Furthermore, a highly advantageous torque converter design may be employed for the method according to the invention in which the transfer capability can be controlled by merely changing the degree of filling and/or the filling pressure. This means that the converter or converters do not require adjustable blades, ring slides or similarly complicated control means thereby resulting in an arrangement which is considerably simpler than the heretofore known control converters.

Incidentally, when employing fully hydraulic transmissions, it was also heretofore necessary to employ a filling pump as well as a control member such as a control piston or the like for opening and closing the supply and discharge passages of the converter or converters when making the same effective or ineffective by filling or emptying. Inasmuch as with the method according to the present invention the control of the high pressure and the degree of filling in the torque converter is advantageously effected by controlling the cross section of the supply or discharge line for the torque converter, it is now merely necessary to design the control openings of the feed control piston in a suitable manner and to adjust the same accordingly. Thus, a simple converter design with fixed blades and also a simple well proven filling control may be employed so that the drive will excel in simplicity and safety of operation at a rather low price.

It has heretofore been suggested to control the output conveyed by a fluid circuit, by controlling the degree of filling and if necessary the filling pressure, and the variation of the filling has been employed with variable fluid couplings. With torque converters, however, these control methods have not been employed for controlling the respectively required work because by reducing the high pressure or the filling in the torque converter, the transfer capability drops initially very suddenly down to a minor fraction of the full value so that in this way a uniform power control is not possible over the entire working range of the torque converter. Furthermore, this control has inherent thereto a reduction in the degree of efficiency, and furthermore a corrosion of the blades was feared. It is for these reasons that according to a heretofore known suggestion, the high torque pressure was varied merely for the purpose to aid a complete interruption of the power transfer in a torque converter with adjustable blades or similar control elements. This was done for the purpose of making possible or facilitating the shifting of a change gear transmission following the torque converter. In contrast to this arrangement, according to the present invention, the pressure and filling control in the torque converter is effected during the normal operation with power output, i.e. not merely during a change in the velocity range. Furthermore, expensive control elements liable to disturbance such as adjustable blades and the like are deliberately to be eliminated.

Also the heretofore known control methods fail to disclose the new method of operation according to which in the torque converter, exclusively the filling pressure and/or the degree of filling is to be employed for control purposes and this in certain limited working ranges limited as to time, preferably only within the range of low outputs, inasmuch as in this working range the power to be conveyed is on one hand rather small and on the other hand is employed only temporarily, and, consequently, the degree of efficiency of the torque converter during the said short time is irrelevant, as a minor reduction in the degree of efficiency within this operating range will be insignificant. In the working range of high output which is effective during the major portion of the time of operation, only or primarily only the engine control is employed, i.e. control of the engine speed or engine output, which is highly favorable as to the degree of efficiency, so that the method according to the present invention does not result in a reduction of the total degree of efficiency.

In most instances of application of the method according to the present invention, in the working range for high outputs, the high pressure and degree of filling in the torque converter are kept at their full values, above all with regard to a high degree of efficiency. For special purposes, especially for preventing the friction limit of rail vehicles from being exceeded, or for purposes of a certain course of the output torque or the input into the torque converter, it is sometimes nevertheless advisable also in the working range of high outputs to effect a change in the high pressure and/or the degree of filling of the torque converter.

With the transmissions underlying the present invention, an idling condition was heretofore obtained by completely emptying the torque converter while the engine was idling. When starting, therefore, a considerable time is required, sometimes several seconds, until the torque converter was filled completely and obtained its full transfer capability.

Therefore, according to a further development of the present invention, an idling operational condition with high starting readiness, i.e. a working condition from which in a minmum of time the vehicle could start with full traction force will be obtained by maintaining the engine as heretofore at idling speed while filling the torque converter just to such an extent, for instance to two-thirds, that its output power is hardly noticeable. It will then be possible to start within a minimum of time because it is merely necessary to complete the torque converter filling and to bring the internal combustion engine up to a higher output step.

The change in the high pressure and the degree of filling in the torque converter may be effected in a continuous manner. However, for practical purposes it will suffice to change these factors of operation in two or more stages and this way of operation is preferable in view of the thus obtained simplicity of the control device.

*Structural Arrangement*

Referring now to the drawings in detail and FIG. 1 thereof in particular, according to the drive shown therein and intended for a locomotive, a variable diesel engine 10 drives the pump wheel 13 of a torque converter 14 through a step-up gear transmission 11 and the primary shaft 12 of the torque converter. The power conveyed to the torque converter is then by means of the turbine wheel 15 conveyed to output shaft 16, which may be termed the secondary shaft of the torque converter. From here the power is conveyed to the driving wheels (not shown in the drawing) of the locomotive.

The primary shaft 12 is furthermore drivingly connected to an oil pump 20—filling pump—through a bevel gear transmission 17 and a vertical shaft 18, said pump 20 being located in an oil sump 19. The oil fed by pump 20 may pass through a pressure conduit 21, a control cylinder 22 and a feeding line 23 to the working chamber of the torque converter 14. The torque converter may be emptied into the oil sump through the discharge conduit 24, control cylinder 22, and conduit 25.

The control cylinder 22 is shown on a larger scale in FIG. 2 and comprises a control piston 26 adapted to be displaced by means of a control rod 32. As will be evident from FIG. 2, a pressure spring 27 continuously urges piston 26 into its uppermost position in which it frees the control opening 28 for a passage from the discharge conduit 24 for the torque converter to the discharge conduit 25, thereby permitting an emptying of the torque converter. When piston 26 occupies its lowermost position, the pressure conduit 21 communicates with the filling conduit 23 of the torque converter through control openings 29 so that the torque converter will receive its complete filling and complete high pressure. When the control piston 26 occupies intermediate positions, i.e. positions intermediate said two above mentioned end positions, the filling and pressure of the torque converter will correspond to intermediate values.

For reasons of manufacture, the control openings 28 and 29 are arranged in a separate bushing 30 (FIGS. 2 and 3)

which is stationarily arranged in the housing of the control cylinder 22. In order to avoid an over-sensitivity of the control, according to a special construction in conformity with the invention, the control openings 28 and 29 in the piston adjusting direction 31 are larger than those perpendicular thereto.

The arrangement furthermore comprises a control lever 34 which is operable by the vehicle operator and is adapted to adjust the control piston 26 as well as the speed of the diesel engine 10. The control lever 34 has connected thereto a control cam 35 as will be clearly evident from FIGS. 1 and 2. Depending on the position of the lever 34 and cam 35, the control piston 26 will, by means of roller 36 and rod 32, be moved into a corresponding position in which it will adjust the piston 26 for bringing about a corresponding filling and high pressure in the working chamber of the torque converter.

According to FIG. 1, the control lever 34 is furthermore through rods 37 and 38, the latter being provided with an oblong aperture 39, connected with a control lever 40 of the fuel pump 41 of the diesel engine. Depending on the position of this lever 40, the engine will be adjusted for a corresponding speed. For purposes of simplification, the lever 40 will henceforth be designated as fuel lever. The tension and pressure spring 42 connected to rod 38 continuously urges the fuel lever 40 into the position shown in the drawings (position L/1) and tends to maintain said lever in this position in which the engine runs at idling speed. The arrangement and dimensions of the control link system and the levers as well as the design of the control cams 35 are so selected that by means of the control lever 34 the following operations will be brought about.

*Control lever 34 in position zero.*—In this position, the fuel lever 40 occupies the position zero and the engine is at a standstill. When point zero of the control cam 35 is in control position, the torque converter is completely empty. This means a complete standstill of the drive.

*Control lever 34 in position L.*—The fuel lever 40 will occupy the position L/1 and the engine will be idling. When point L of the control cam 35 is in control position, the torque converter is still empty.

*Control lever 34 occupying the position L'.*—In this position, the fuel lever 40 is due to its oblong aperture 39 still on L/1, and the engine is still idling. When point L' of cam 35 occupies its control position, the torque converter has been emptied to about ⅔ but it still does not yield a noticeable traction force. This is the idling position of the transmission from which a quick start will be possible.

*Control lever 34 in position I.*—In this position the engine is still idling. The torque converter is completely filled but yet without high pressure and produces a rather small traction force (switching operation).

*Control lever 34 in position II.*—The engine is still idling. The torque converter is completely filled and its high pressure has already reached a portion of its maximum value. The transmission will now yield a somewhat higher traction force—switching operation.

*Control lever 34 in position 1.*—The engine is still in idling position. Left-hand end of rod 37 is just at the right-hand end of the oblong aperture 39. The torque converter is now completely filled and has its maximum high pressure. The traction force has again increased and now corresponds to the smallest traction force obtainable with idling engine and with normal drives.

*Control lever 34 in positions 2 to 6.*—The fuel lever will be tilted to the corresponding positions 2 to 6 and increase engine speed correspondingly. Furthermore, the circularly shaped portion of the control cam 35 will between points 1 and 6 move into control position so that the torque converter will then without change retain complete filling and complete high pressure—normal power operation.

Figure 5:
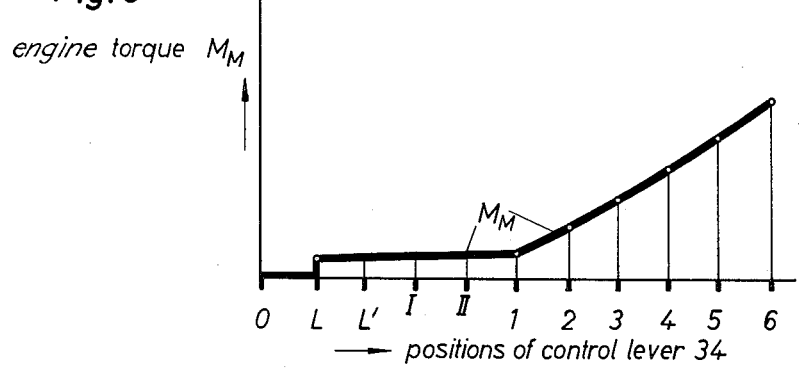
Figure 6:
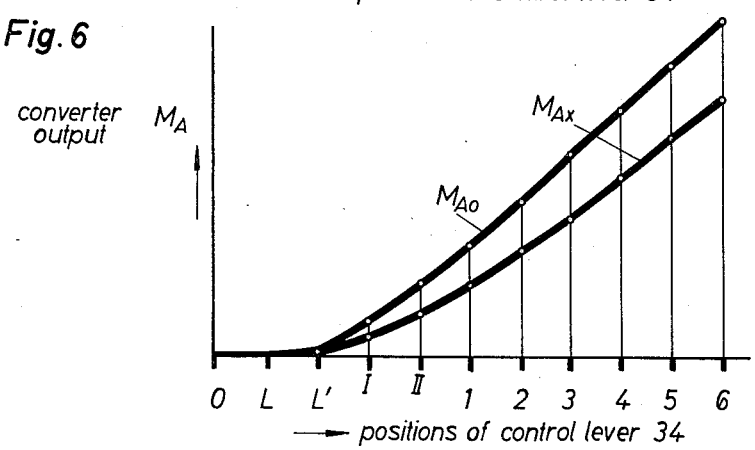

FIGS. 4 to 6 illustrate the method of operation according to the invention. On the abscissa of each of the said three figures are plotted the control lever positions 0, L, L', I, II and 1 to 6 according to their sequence. The ordinates have plotted thereon $F_W$ representing the course of the torque converter filling, the torque converter high pressure D and the engine speed $n_M$. It will thus be clearly evident from the various graphs of FIGS. 4 to 6 that from L to I the torque converter filling and from I to 1 the torque converter high pressure increase from zero to their maximum values while simultaneously the engine speed (idling speed) is held constant at its lowest value, whereas in the control range from 1 to 6 the engine speed exclusively is varied from its idling value to full speed.

The ordinates of the graph $M_M$ in FIG. 5 illustrate the course of the engine torque. This engine torque is rather low from L to 1 corresponding to the idling speed of the engine. From stage 1 the engine torque increases quickly in conformity with the increase in fuel and speed.

In FIG. 6, the ordinate has plotted thereon the converter output torque $M_A$. The upper graph $M_{A0}$ applies to the torque output speed zero (vehicle at a standstill), whereas the graph $M_{Ax}$ applies to any driving speed $n_{Ax}$ (also see FIG. 7). At the control step L' (idling position of the transmission), the torque output is in spite of for instance a ⅔ partial filling of the converter, still so low that a noticeable traction force does not exist (idling speed condition with high starting readiness).

The diagram of FIG. 7 shows the course of the converter output torques $M_A$ in conformity with the converter speeds $n_A$. The bundle of curves $M_{AI}$, $M_{AII}$ and $M_{A1}$ to $M_{A6}$ correspond to the control lever positions I, II and 1 to 6. Furthermore, this figure also contains torque curves $M'_{A1}$, $M'_{A6}$ for the output stroke of a further converter of a second driving velocity range. As will be evident, without the filling and high pressure control in the starting torque converter, only the single shaded range of operation between the curves $M_{A1}$, $M'_{A1}$, and $M_{A6}$, $M'_{A6}$ would be obtainable. Thus, the present invention makes it possible with a minimum of structural equipment also to exploit the double shaded range of operation with low torques at low speeds (low outputs).

It is a matter of course that with drives comprising a plurality of torque converter velocity ranges each having a torque converter associated therewith, it will be possible to employ the control according to the invention for each one of these torque converters. For the requirements of the actual operation, it is, however, in most instances sufficient to control the torque converter in the starting velocity range only in the manner according to the invention. In this connection, it will be apparent from FIG. 7 that an operation with low traction forces and low driving speed and the prevention of swaying in view of too high traction forces, is necessary almost exclusively in the starting velocity range only.

FIG. 8 concerns a modification of the arrangement according to the invention, which differs from the previously described embodiment primarily in that it is additionally equipped with a device for preventing the swaying of the driving wheels of the locomotive. In the diagrammatic illustration of FIG. 8, for purposes of simplification, those structural elements which correspond to those in FIGS. 1 to 3 have either been omitted or have been designated with the same reference numerals as in FIGS. 1 to 3.

The control piston 26, the control cylinder 22, and the conduit connections 21, 23, 24 are likewise designed in the manner of the corresponding parts in FIGS. 1 and 2. However, the piston rod 32a has rigidly connected thereto a piston 45 which is displaceable in a non-stationary, i.e. movable cylinder 46. The arrangement furthermore comprises a pressure spring 47 continuously urging piston 45 into the uppermost end position in its cylinder 46. The upper chamber of the cylinder 46 communicates through a flexible hose 48 and a conduit 49 with a gear measuring pump 50 which is driven by a shaft 51 of a wheel axle of the locomotive. Connected to the pressure line of pump 50 is a discharge line with a throttle 52 which is so dimensioned that the pump will produce a pressure which is dependent on the driving speed and will produce a pressure increasing with the driving speed. A rod 32b with slide roller 36 is rigidly connected to the housing of cylinder 46 and is adapted to adjust the position of the cylinder 46 in conformity with the contour of the control cam 35a. Control cam 35a is, in contrast to the contral cam of FIGS. 1 and 2, designed in such a way that its control points 5 and 6 are located on shorter radii than the control points 1 to 4. The connection of the control rod 37 with the fuel lever of the diesel engine corresponds, however, to that of FIG. 1.

The control system of FIG. 8 operates in the following manner. In the control lever positions 1 to 4, cam 35a presses cylinder 46 and piston 45, which occupies its uppermost relative position, downwardly to such a extent that control piston 26 will occupy its lowermost position in which the torque converter will obtain its complete filling and full high pressure. This control condition depends on the magnitude of the driving speed and the pressure of the measuring pump 50.

When the control lever is in driving positions 5 and 6 which correspond to an almost full or to a full engine speed, control cam 35a presses cylinder 46 downwardly by a shorter distance than was the case with the control lever in positions 1 to 4. If at this time the driving speed of the locomotive is so low that the torque converter output speeds pertaining thereto are below $n_{Ax}$ of FIG. 7, also the measuring pump pressure will be low, and piston 45 will remain in its intermediate position or in its uppermost end position in cylinder 46. As a result thereof, control piston 26 occupies an intermediate position in which the high pressure or also the filling of the torque converter will be reduced over their full values. The torque converter high pressure may assume for instance a course along the line $d'$ in FIG. 4. In view of this reduction in the high pressure or filling, also the output torque of the torque converter will drop, namely to such an extent that the torque converter output torque will not exceed the friction limit R of FIG. 7 so that the danger of swaying will be avoided.

At driving speeds which correspond to a torque converter output speed of $n_{Ax}$ or higher, a swaying will not occur and, therefore, a reduction in the torque converter transmission ability is not desirable. At these driving speeds, the correspondingly high pressure of the measuring pump 50 presses piston 45 against the thrust of spring 47 downwardly to such an extent that the control piston 26 will also at the control lever positions 5 and 6 reach its lowest position while the torque converter will obtain its full filling and full high pressure. Thus, at the control lever positions 5 and 6 and at torque converter output speeds exceeding $n_{Ax}$, no reduction in the torque converter transmission ability will occur.

In order to employ the engine as favorably as possible, it may sometimes be expedient to control the input of the torque converter over the entire range of operation, for instance so as to maintain the same at a constant value—nominal value—approximately in conformity with the driving speed. This may likewise be effected by varying the superimposing pressure in the torque converter namely in all power stages of the engine. A control device for this purpose is shown in FIG. 9. In FIG. 9 those elements corresponding to those of FIGS. 1, 2 and 8 have been designated with the same reference numerals as in FIGS. 1, 2 and 8 or have been omitted.

The cam 35 connected to the control or driving lever 34 has the same contour as the cam in FIGS. 1 and 2 and thus comprises a circular contour within the range of the control points 1 to 6. If thus the additional influence of the driving speed has not yet become effective, the control piston 26 will in each of the control lever positions 1 to 6 occupy a position in which the inlet control slots are fully opened (complete filling and complete high pressure in the torque converter). With increasing driving speed, the gear measuring pump 50 produces a likewise increasing pressure acting from below upon auxiliary piston 54. Depending on the magnitude of this pressure, the pressure spring 55 will be compressed more or less, and piston 54 will be moved upwardly while automatically the control piston 26 will be moved into an intermediate position for reduced torque high pressure by means of a correspondingly shaped second cam 56 and a lever 58. The torque converter will then be able to absorb only a lower input with regard to the same torque converter input speed. Cam 56 is so designed that relationship between torque converter output speed $n_2$ and the desired power input $N_1$ will be in conformity with the showing in FIG. 10 according to which the power intake $N_1$ remains constant over the entire range of operation. Without the above described control device, the power input of the torque converter would follow the curve $N'_1$ and, what is generally undesirable, would vary in conformity with the driving speed. Under the assumption that the control lever occupies one of the positions 1 to 6, the graph of FIG. 11 shows the course of stroke H of control piston 26 in conformity with the torque converter output speed $n_2$. The contour of cam 56 will have to be designed in conformity with this curve H.

The connection between control cam 35 and control piston 26 includes two rods 32c and 32d which latter is provided with an oblong aperture 57 and a pressure spring 58. This resilient connection is required in order to make it possible that with the control lever occupying any of the positions 1 to 6, control piston 26 may be moved from its lowermost end position into an intermediate position.

It is, of course, to be understood that the present invention is, by no means, limited to the particular embodiments shown in the drawings but also comprises any modifications within the scope of the appended claims.

What we claim is:

1. In combination: a prime mover variable in speed within certain limits, a power transmission drivingly connected to said prime mover and including a hydrodynamic torque converter for transmitting power to an output shaft of the transmission, feeding and discharge lines connected to said torque converter for respectively conveying actuating fluid to and discharging actuating fluid from said torque converter, first control means arranged in at least one of said lines for controlling the flow of fluid therethrough, said first control means being operable to vary at least one of the two operating characteristics of said torque converter, namely, the degree of filling and the high pressure, between minimum and maximum values, second control means operatively connected to said prime mover for varying the speed thereof between a low speed and full speed, and adjusting means including an adjusting member adjustable between upper and lower limits within a lower range and also between limits within a higher range and connecting means between said adjusting member and said first and second control means, said adjusting means being so designed that in response to a setting of said adjusting member between said limits in said lower range the second control means will control said prime mover so as to maintain a substantially constant low speed and at the same time said first control means will control said fluid flow so that at least one of the characteristics of the torque converter, namely, high pressure and degree of filling, will be adjusted to one value between said minimum and maximum values, while in response to the adjustment of said adjusting member to the said higher adjusting range said prime mover will be adjusted to all higher speeds.

2. The combination according to claim 1 in which operation of said adjusting member between lower and upper limits of said lower range will adjust said first control means to vary said operating characteristic within said minimum and maximum values and said characteristic will be at a maximum value on the adjustment of said adjusting member to at least one point in said upper range.

3. The combination according to claim 2, in which said adjusting member in said higher range maintains said first control means in such position as to insure maximum filling and pressure in said torque converter for normal power operation.

4. The combination according to claim 1, in which said first control means comprises a member with control openings forming passages in one of said lines and a reciprocable member adjustable to control the effective area of said openings, said openings having a greater extension in the direction of movement of said reciprocable member than transverse thereto.

5. The combination according to claim 1, in which said output shaft is adapted to drive vehicle wheels, and safety means responsive to the speed of said output shaft and operatively connected to said first control means for controlling at least one of said two characteristics, whereby said safety means is adapted to prevent the traction force exerted upon the vehicle wheels exceeding the friction limit of the wheels.

6. The combination according to claim 1, in which said output shaft is adapted to drive vehicle wheels, and safety means responsive both to the driving speed of said output shaft and to the setting of said adjusting member and operatively connected to said first control means to change said characteristic so as to reduce the output speed of said converter, whereby said safety means is adapted to prevent the traction force exerted upon the vehicle wheels exceeding the friction limit of the wheels.

7. The combination according to claim 1, and a third control means responsive to the output speed of said torque converter and being operatively connected to said first control means for varying at least said one of said characteristics with variation in said output speed.

8. The combination according to claim 1, in which said connecting means includes a lost motion system between said adjusting member and said second control means so that said adjusting means is ineffective within said lower adjusting range of said adjusting member to operate said second control means, and said second control means will maintain said substantially constant low speed while said at least one characteristic of said torque converter is being adjusted, said connecting means being operative within said higher adjusting range of said adjusting member to adjust the speed of said prime mover within the range from said substantially constant low speed to maximum.

References Cited in the file of this patent
UNITED STATES PATENTS

| | | |
|---|---|---|
| 1,900,119 | Lysholm et al. | Mar. 7, 1933 |
| 2,761,276 | Kollmann | Sept. 4, 1956 |
| 2,878,642 | Maurice et al. | Mar. 24, 1959 |
| 2,902,938 | Ebert | Sept. 8, 1959 |

FOREIGN PATENTS

| | | |
|---|---|---|
| 112,141 | Sweden | Oct. 17, 1944 |